US007337290B2

(12) United States Patent
Rajamani et al.

(10) Patent No.: US 7,337,290 B2
(45) Date of Patent: Feb. 26, 2008

(54) DEADLOCK RESOLUTION THROUGH LOCK REQUEING

(75) Inventors: Kumar Rajamani, Belmont, CA (US); Jaebock Lee, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 156 days.

(21) Appl. No.: 10/406,880

(22) Filed: Apr. 3, 2003

(65) Prior Publication Data

US 2004/0199734 A1   Oct. 7, 2004

(51) Int. Cl.
*G06F 12/14* (2006.01)
(52) U.S. Cl. ...................................... 711/163
(58) Field of Classification Search ................ 711/163, 711/158
See application file for complete search history.

(56) References Cited

U.S. PATENT DOCUMENTS

| | | | | |
|---|---|---|---|---|
| 4,791,554 A * | 12/1988 | Hirota et al. ................... | 707/8 |
| 5,440,743 A * | 8/1995 | Yokota et al. .............. | 710/200 |
| 5,454,108 A * | 9/1995 | Devarakonda et al. ...... | 718/104 |
| 5,459,871 A * | 10/1995 | Van Den Berg ............ | 718/104 |
| 5,551,046 A * | 8/1996 | Mohan et al. .................. | 707/8 |
| 5,596,754 A * | 1/1997 | Lomet .......................... | 710/200 |
| 5,774,731 A * | 6/1998 | Higuchi et al. .............. | 710/200 |
| 5,940,828 A * | 8/1999 | Anaya et al. ................... | 707/8 |
| 6,272,491 B1 | 8/2001 | Chan et al. | |
| 6,275,823 B1 * | 8/2001 | Ronstrom ....................... | 707/8 |
| 6,405,274 B1 | 6/2002 | Chan | |
| 6,708,198 B1 * | 3/2004 | Simmons et al. ........... | 718/104 |
| 6,990,503 B1 * | 1/2006 | Luo et al. .................... | 707/200 |
| 2002/0087811 A1 * | 7/2002 | Khare et al. ................. | 711/146 |
| 2002/0095403 A1 * | 7/2002 | Chandrasekaran et al. ..... | 707/1 |

* cited by examiner

*Primary Examiner*—Matthew Kim
*Assistant Examiner*—Sheng-Jen Tsai
(74) *Attorney, Agent, or Firm*—Bingham McCutchen LLP

(57) ABSTRACT

A method and system for using a requeueing procedure to resolve deadlocks in a computing system is disclosed. A request for a resource may be requeued after a designated period of time or wait cycles if it is blocked from being granted. For example, a request for exclusive ownership of a resource could be requeued if it cannot be granted within an appropriate period of time. These types of requests are requeued to allow other requests for the same resource to move ahead in the wait queue. This allows other grantable requests behind the blocked request to be immediately granted. Using this approach, it is possible that allowing the other requests behind the timed-out request to move ahead in the queue will set off a chain reaction of accesses to resources which will clear the deadlock situation that initially causes the requeued request(s) to be blocked.

37 Claims, 16 Drawing Sheets

Go to Fig. 6f

DEADLOCK RESOLUTION THROUGH LOCK REQUEING

BACKGROUND AND SUMMARY

The invention relates to computer systems, and more particularly to a method and mechanism for deadlock resolution.

Entities often need to access one or more resources to perform work in a computing system. Examples of such entities include processes, tasks, and threads. In modern computing and database systems, at any moment in time, there may be an extremely large number of concurrent entities that seek to access the known resources in a system. However, conflicts may arise if multiple entities are permitted to perform incompatible accesses to the same resources at the same time. For example, if two entities are permitted to write to the same piece of data at the same time, then possible errors or coherency uncertainties could arise with respect to the status or content of that piece of data. The issue of coherency and access conflicts becomes even more complex in a multi-instance database system that allows common access to a single database across multiple networked nodes, such as occurs with the Real Application Clusters (RAC) product available from Oracle Corporation of Redwood Shores, Calif.

To prevent such conflicts from occurring in a computing system, various mechanisms may be implemented to manage the type, number, and/or ordering of accesses that are permitted to resources in the system. A common mechanism that is used to synchronize and manage access to resources in computing and database systems is referred to as a "lock". A lock is a data structure that indicates whether or which particular entities have been granted rights to a resource. An entity must acquire a lock to a resource before the entity is permitted to access the resource.

The scope of possessory or access rights granted to an entity for a particular resource is often related to the type of work that the entity intends to perform upon that resource. For example, an "exclusive lock" could be granted to an entity that seeks to access a data item in a way that is incompatible with concurrent access by other entities, e.g., to modify, write or delete the data item. The exclusive lock therefore grants exclusive access to the data item, which prevents other entities from being able to concurrently access the same data item at the same time. This type of lock essentially serializes access to its corresponding resource. A "shared lock" could be granted if an entity wishes to perform activities upon a resource which can also be concurrently performed with activities by other entities upon the same resource without introducing conflicts or inconsistencies to the data, e.g., to read a data item. Therefore, the shared lock can be concurrently granted to multiple entities for the same resource at the same time. Depending upon the exact configuration of the computing or database system, other types of locks and lock scopes can be implemented to manage access to data.

The combination of locks granted for a resource is generally managed to avoid allowing incompatible activities upon that resource. For example, if an exclusive lock has been granted to a first entity for a data item, then no other lock requests are normally granted to that same data item until the first entity has completed its work and released the exclusive lock. All other lock requests, and their corresponding data access activities, are placed on hold until the lock requests are granted. If a shared lock has been granted to one or more entities for a data item, then subsequent requests for a shared lock upon the same data item can be concurrently granted. However, a subsequent request for an exclusive lock will be placed on hold until the previously granted shared locks have been released.

The occurrence of a "deadlock" is a problem that could significantly affect the orderly granting and releasing of locks, and therefore the orderly access of resources, within a computing system. A deadlock occurs within a set of entities when each entity in the set is waiting for the release of at least one resource owned by another entity in the set.

For an example of a deadlock, consider the resource management situation shown in FIG. 1a. This figure shows an example approach for implementing locks in a computing system, in which every resource (e.g., in a database cache) is associated with a lock structure having both a request queue and a grant list to identify "waiters" and "owners" for that resource. As shown in FIG. 1a, a first lock structure 100 is associated with a first resource R1. A second lock structure 101 is associated a second resource R2. Each lock structure corresponds to a granted lock list and a lock request queue. Thus, lock structure 100 is associated with a lock grant list 102 that identifies that an entity P1 presently owns a shared lock 102a to resource R1. Lock structure 100 is also associated with a lock request queue 104 that contains a first request 104a for an exclusive lock for an entity P2 and a second lock request 104b for a shared lock for entity P3. For resource R2, lock structure 101 is associated with a lock grant list 106 that identifies that an exclusive lock 106a has already been granted to entity P3. Lock structure 101 is also associated with a lock request queue 108 containing a lock request 108a from entity P1 for a shared lock to resource R2.

Entity P1 already holds a shared lock 102a to resource R1, but needs to acquire a shared lock to resource R2 before it can complete its work. In this situation, it is assumed that P1 will not normally release its lock to R1 until it has completed its work (e.g., until P1 has been able to also access resource R2). However, P1 is unable to immediately acquire a shared lock to R2 since entity P3 already holds an exclusive lock 106a to resource R2. Therefore, P1 needs to wait until P3 releases its exclusive lock 106a to R2 before P1 can acquire its desired lock to R2.

To complete its work and release its exclusive lock 106a to resource R2, P3 needs to access a resource R1, as indicated by its request 104b to acquire a shared lock. The lock request queue 104 contains a prior lock request 104a from entity P2 to acquire an exclusive lock to resource R1. The prior lock request 104a for an exclusive lock cannot be granted since entity P1 already holds a shared lock 102a to R1. However, P1 will not release its shared lock 102a until it has been granted its lock request 108a and given access to R2.

A deadlock situation exists since lock request 108a cannot be granted until P3 releases its exclusive lock 106a to R2. However, P3 will not release its exclusive lock 106a until it completes its work, which requires lock request 104b to be granted. Lock request 104b cannot be granted since it is blocked behind lock request 104a in lock request queue 104, and lock request 104a cannot be granted until P1 releases its lock 102a to R1. Coming back to the beginning of this circular deadlock, P1 cannot release its lock 102a to R1 until lock request 108a has been granted. Because P1, P2, and P3 are waiting for locks to be released before completing their work, but the locks cannot be granted to each other and the entities cannot proceed with work unless the others release one or more resource(s), they are deadlocked. This deadlock is symbolically shown in FIG. 1b, in which "P1—>P3" means that entity P1 is being blocked by entity P3. In this deadlock situation, P1 is being blocked by the exclusive lock 106a held by P3. P3 is being blocked by the lock request 104a for an exclusive lock by P2. P2 is blocked by the shared lock 102a owned by P1.

Various detection and resolution techniques have been developed to address deadlock situations. For example, many deadlock handlers employ the "cycle" or "time out" techniques to detect deadlocks. In this approach, after a process waits a threshold period of time for a resource, a deadlock is presumed to exist or a wait-for graph is generated and examined for any cycles. If any cycles are identified or if the threshold time is exceeded, then a possible deadlock has been detected. At this point, a deadlock resolution technique could be applied to eliminate the deadlock, e.g., by timing out or "resetting" some or all of the resources, locks, and/or entities in the system.

However, existing deadlock detection and resolution techniques cannot adequately resolve deadlocks that occur across different classes of locks/resources and/or in a clustered data environment for database systems. In these situations, access to the different classes of resources may be managed by unconnected or orthogonal lock spaces/lock management structures. Consider a database system that has different classes of resources. A first example class of resources (referred to herein as "row cache" data) may be system/database metadata, which is data that describes, defines, or manages the fundamental structures and data types used to store and access data in the database, e.g., definitional data that defines the configuration of tables in a database. A first set of lock structures may be used to manage access to row cache data. A second example class (referred to herein as "buffer cache" data) may be the actual data that is stored in the structures of the database, e.g., data stored in database tables. A second set of lock structures/lockspaces may be used to manage access to the buffer data. Since the two lock spaces are generally unrelated, a conventional deadlock handling mechanism does not have the background knowledge of the locks and/or resources in the different lock spaces to even detect the deadlock, much less coordinate the locks across the different lock spaces to resolve the deadlock. The problem is further exasperated in clustered environments in which a single database can be "virtually" spread across multiple nodes that are networked together. In this environment, lock management structures on the distributed nodes may be employed to manage the resource locks. Spreading data and lock management structures across multiple nodes makes it even more difficult for conventional deadlock resolution techniques to identify and resolve deadlocks.

Accordingly, the present invention provides a method and system for using a requeueing procedure to resolve deadlocks in a computing system. In one embodiment of the invention, a request for a resource may be requeued after a designated period of time or wait cycles if it is blocked from being granted. For example, in one embodiment, a request for exclusive ownership of a resource could be requeued if it cannot be granted within an appropriate period of time. With lock requeueing, the requests for locks associated with the resources are requeued to allow other requests for the same resource to move ahead in the wait queue. This allows other grantable requests behind the blocked request to be immediately granted. Using this approach, it is possible that allowing the other requests behind the timed-out request to move ahead in the queue will set off a chain reaction of accesses to resources which will clear the deadlock situation that initially causes the requeued request(s) to be blocked.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention. The same or similar elements in the figures may be referenced using the same reference numbers.

DETAILED DESCRIPTION

The present invention provides a method and mechanism for using a requeueing procedure resolve deadlocks in a computing system. For the purpose of illustration, the described requeueing procedure is being performed with respect to locks and lock structures associated with resources in a computing or database system. It is noted that the described inventive principles may be similarly applied to other structures associated with resources in a computing system besides locks and lock structures. In addition, any resource in a computing or database may be managed using this inventive process, including any type of data, metadata, log structure, network resource, or physical resource.

In one embodiment of the invention, certain requests for a resource or the lock associated with that resource may time-out or be requeued after a designated period of time or wait cycles if it is blocked from being granted. For example, consider a request for exclusive ownership of a resource that is presently being blocked because one or more other processes already owns a shared lock to that resource. With lock requeueing, these requests for an exclusive lock are requeued to allow other immediately grantable requests for the same resource to move ahead in the wait queue. Other grantable lock requests include, for example, requests for a shared lock on the resource since these additional requests are compatible with the existing shared lock on the resource. This allows the other grantable requests behind the blocked request to be immediately granted. Using this approach, it is possible that allowing the other requests behind the timed-out request to move ahead in the queue will set off a chain reaction of accesses to resources which will clear the deadlock situation that initially causes the timed-out requests to be blocked. One advantage of this approach is that the process can resolve deadlock situations even if the resource management situation involves locks for different classes of locks or lock spaces and/or in a multi-node cluster of a database system. Regardless of the number, types, or interrelationships between the resources, locks or lock spaces that are involved in a deadlock, lock requeueing can be applied to reorder the requests to provide starved requests an adequate opportunity to acquire a desired resource.

Figure 1A:
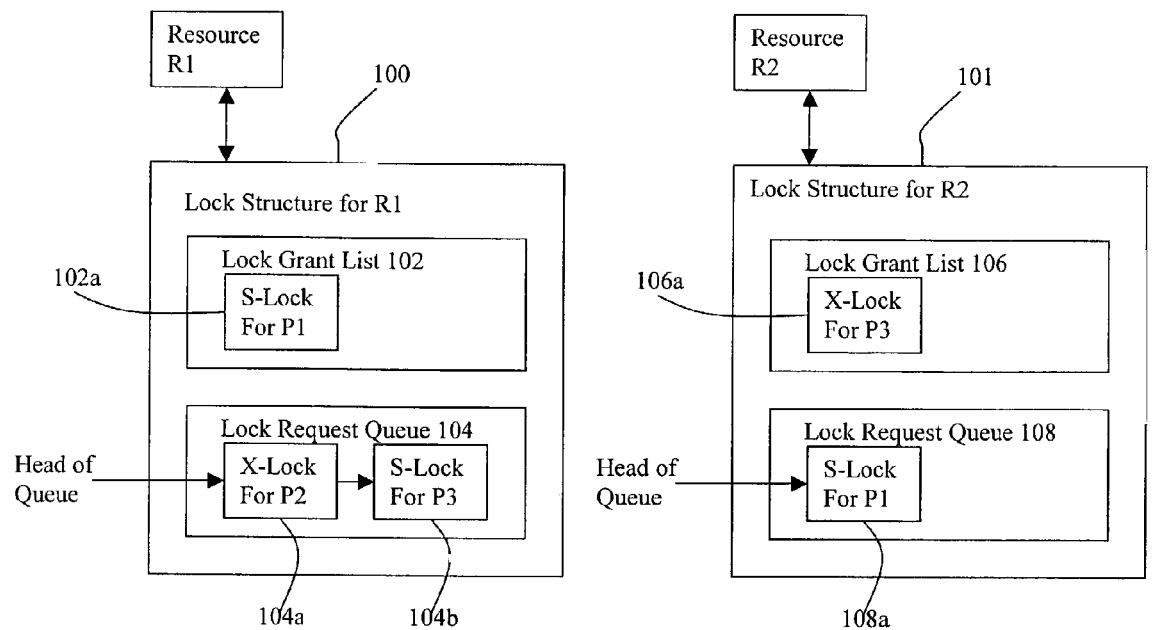
FIGS. 1a and 1b show an example deadlock scenario.
Figure 1B:
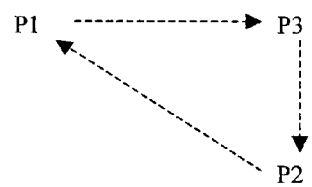
Figure 2:
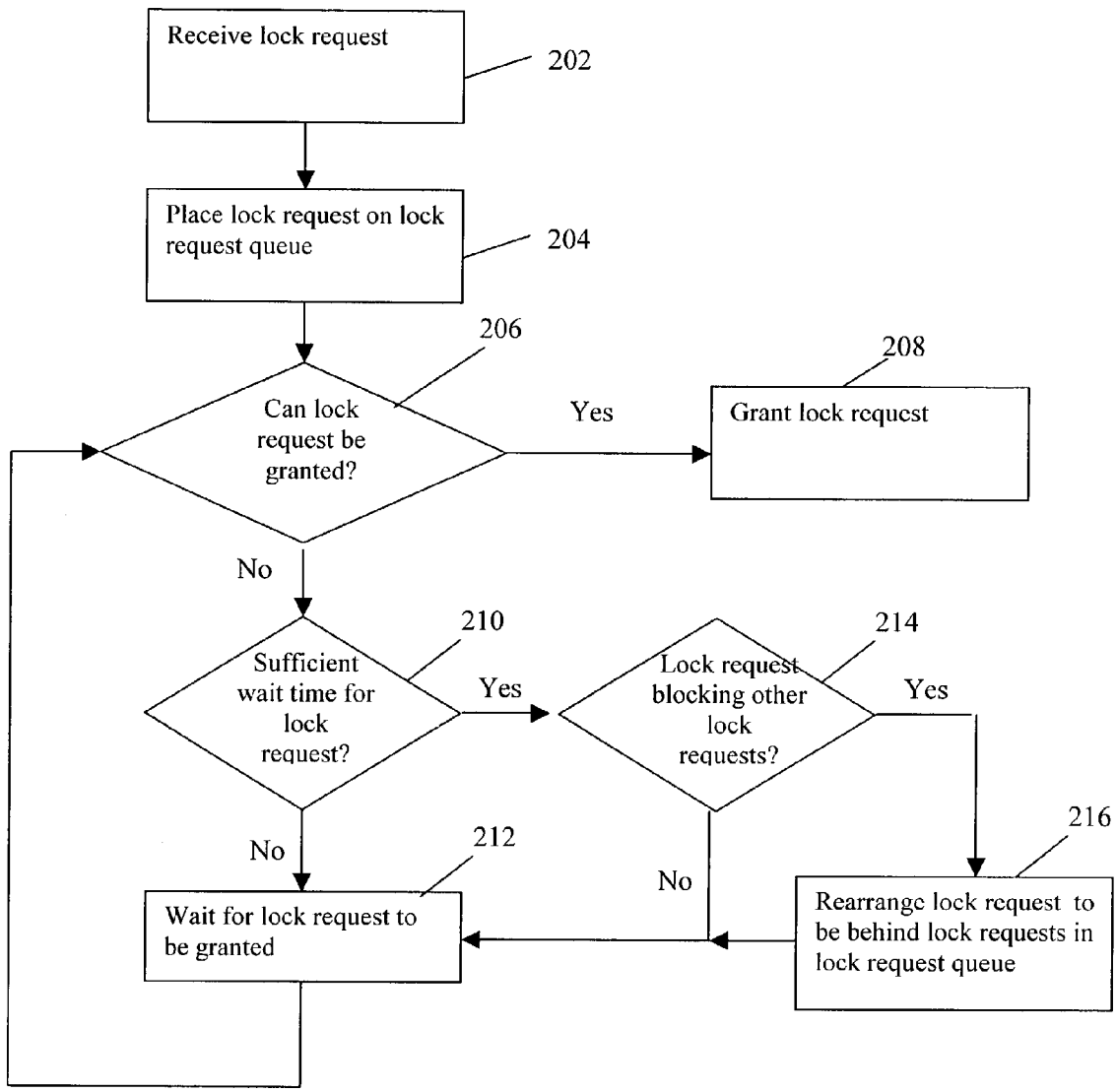
FIG. 2 shows a flowchart of a process for lock requeueing according to an embodiment of the invention.

FIG. 2 shows a flowchart of a method for lock requeueing according to one embodiment of the invention. At 202, a lock request is received by the computing system for an entity that desires ownership/access to a given resource. If a lock structure similar to that shown in FIG. 1a is employed to manage access to resources, then the lock request is placed on a queue of pending lock requests for the resource (204). A determination is made at step 206 whether the lock request can be granted for the resource. As noted above, the combination of locks granted for a resource is generally managed to avoid allowing incompatible activities upon that resource. Therefore, the lock request can only be granted if it does not conflict with any pending locks that have already been granted for the resource. For example, if the pending lock request is for an exclusive lock, but there are already one or more other locks granted for the resource, then the pending lock request cannot be granted until the existing locks have all been released. However, if the pending lock request is for a shared lock, and the shared lock is compatible with any locks that have already been granted for the resource, then the pending lock request can be immediately granted. Therefore, if the pending lock request does not conflict with already granted lock(s), it is granted (208).

If the lock request cannot be granted, then a determination is made whether the request has already been waiting beyond a threshold period of time or threshold number of wait/sleep cycles to acquire the desired lock (210). If not, then the lock request will wait an additional period of time to attempt to acquire the desired lock (212). In one approach, the lock request and/or the requestor are placed in a "sleep" mode while it waits to acquire the sought-after lock.

If the lock request has already been waiting beyond a threshold period of time or cycles, then a determination is made whether there exists other lock requests in the lock queue that are being blocked by the pending lock request (214). For example, assume that the lock request under examination is a request for an exclusive lock that cannot be presently granted because there is a pending shared lock that has already been granted to another entity. Further assume that queued behind the request for the exclusive lock is a request for a shared lock, which is otherwise grantable since it is compatible with the existing shared lock, but which cannot be yet granted because it is queued behind the present request for the exclusive lock and is therefore blocked. If these otherwise grantable lock requests exist in the lock queue, then the lock queue is rearranged to allow these other grantable lock requests to acquire their desired lock(s) (216). This may occur by reordering some or all of the contents of the lock request queue to place one or more of the grantable requests ahead of the non-grantable request. In one approach, the blocking lock request is placed at the end of the lock request queue. Otherwise, if there are no other grantable locks waiting in the lock queue, then the process proceeds to (212) for additional waiting to grant the lock request.

In one particular embodiment, the requeueing process only applies if the timed-out request is for exclusive ownership of a resource, but does not apply if waiting request is for a shared lock on the resource. If the currently timed-out request is for a shared lock, then this implies that the current lock for the resource is being held in exclusive mode (or in another incompatible mode to shared lock), which would also cause other lock requests in the queue to also wait. However, if the timed-out request is for an exclusive mode (or similar type of lock), then it is possible that other requests for a different type of lock in the queue may be immediately grantable. If a timeout occurs while trying to acquire the lock in exclusive mode, the request can be requeued, e.g., to the end of the wait queue, if the following conditions are true: (1) there are other requests on the wait list after the exclusive request; and (2) the other requests to requeue ahead of the timed-out request is not for an exclusive mode. This potentially allows requests for shared access behind the exclusive request to move ahead in the wait queue and be immediately granted.

Therefore, in this approach, 214 comprises the action of determining whether one or more following requests are for a shared lock. In a more general approach, 214 comprises the action of determining whether the other requests in the wait queue are just different from the timed-out request, or in a more specific approach, 214 can be applied to determine if one or more of the following requests are for an immediately grantable lock.

If lock requeueing occurs too many times, then an error handling step can be performed to identify a recurring or non-resolvable problem for a lock request. This error handling step may involve, for example, reporting an error message, removing the lock request from the queue, or even taking the drastic action of killing the process or instance.

Figure 3:
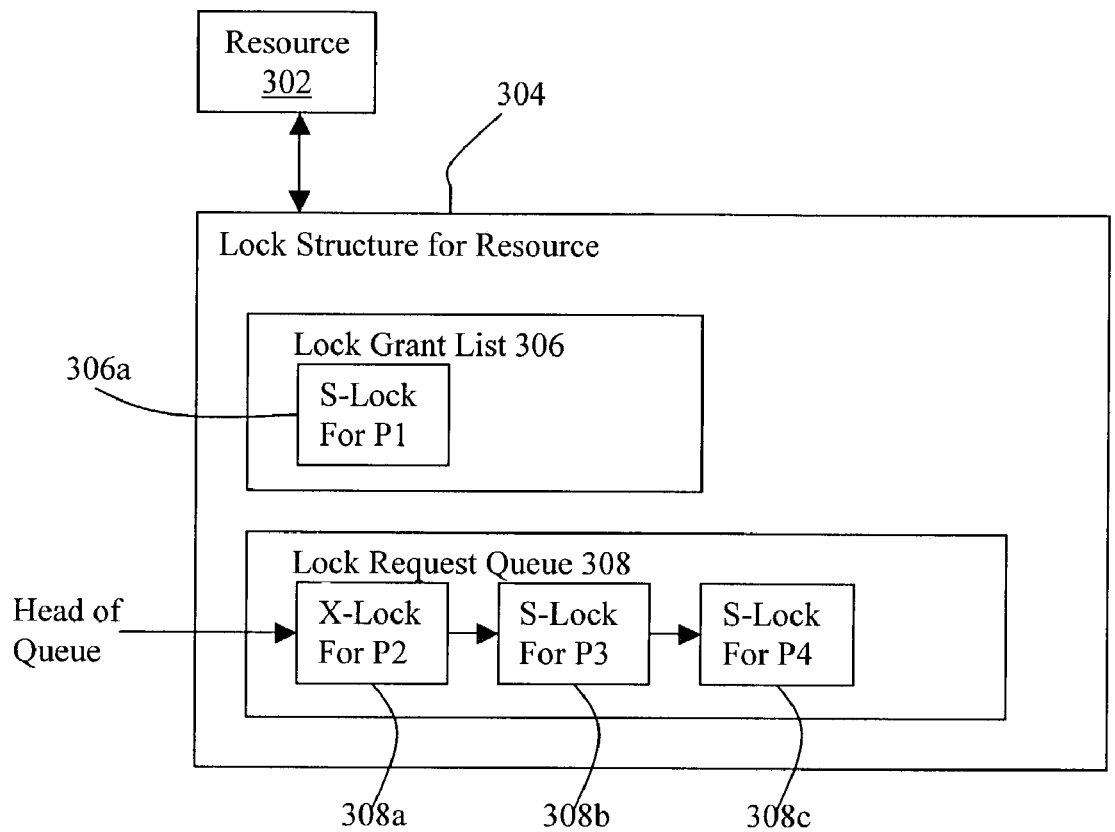
FIG. 3 shows an example lock structure.

To illustrate the application of this process, consider the example lock structure 304 shown in FIG. 3. A resource 302 is associated with the lock structure 304. Lock structure 304 comprises a lock grant list 306 that identifies that a shared lock 306a to resource 302 is presently owned by entity P1. Lock structure 304 also comprises a lock request queue 308 that includes three pending lock requests 308a, 308b, and 308c. Lock request 308a is a request by entity P2 for an exclusive lock to resource 302. Behind lock request 308a in lock request queue 308 is a lock request 308b by entity P3 and a lock request 308c by entity P4 for shared locks to resource 302.

In this situation, lock request 308a cannot be granted since it requests an exclusive lock to resource 302 which conflicts with the existing shared lock 306a already granted to entity P1. Therefore, as noted in step 210 of FIG. 2, a determination is made whether lock request 308a has been waiting beyond a threshold time period or number of wait/sleep cycles. If not, then additional time is spent allowing lock request 308a to wait to see if it can be granted, e.g., on the chance that during the wait period, lock 306a will be released. However, if the threshold wait time has been exceeded, e.g., because a deadlock exists, then lock requeueing is applied to lock wait queue 308.

The time threshold period of step 210 is designated to provide that entities are given adequate opportunity to acquire a desired lock before its lock request is requeued. This avoids the situation in which entities are "starved" of resources merely because they cannot always immediately acquire a lock. The threshold period to wait before requeueing a lock can be adjusted depending upon system conditions and desired performance attributes.

Assume that lock request 308a has already been given ample opportunity to be granted. For whatever reason, e.g., a deadlock situation, lock 306a has not been released and therefore lock request 308a cannot yet be granted. A determination is made whether there exists other (e.g., grantable or shared) lock requests in the queue 308 behind lock request 308a (step 214 from FIG. 2). Here, lock requests 308b and 308c behind lock request 308a would be immediately grantable if placed at the head of the lock request queue 308, since these lock requests are seeking shared locks which do not conflict with the shared lock 306a already granted to entity P1. Therefore, lock requeueing can be applied.

Figure 4:
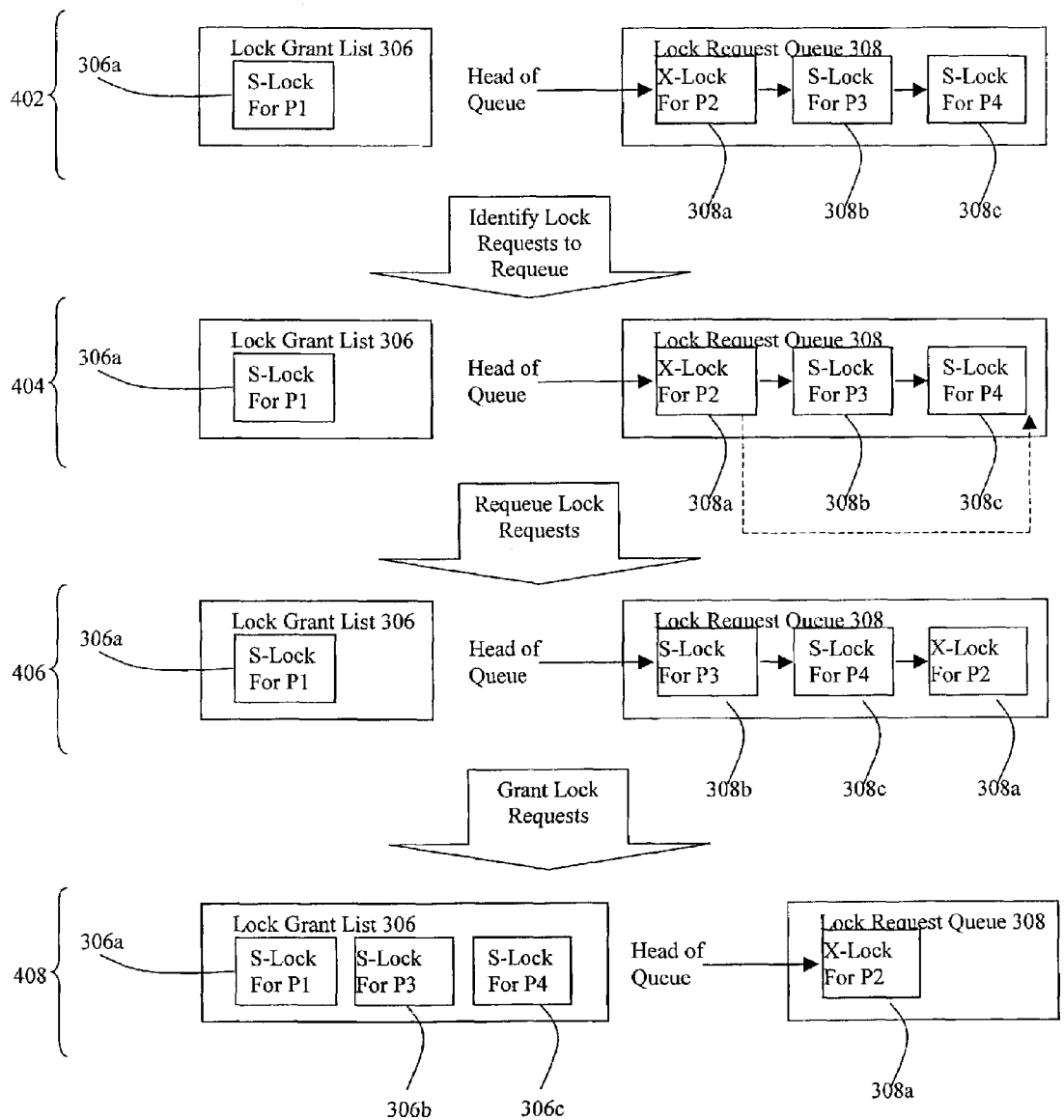
FIGS. 4 and 5 illustrate embodiments of a process for lock requeueing.

FIG. 4 illustrates a process of lock requeueing applied to the lock arrangement shown in FIG. 3. Configuration 402 shows the initial arrangement of lock requests from FIG. 3. Lock request 308a is at the head of the lock request queue 308. Lock request 308a is presently blocked from being granted because it seeks an exclusive lock on behalf of entity P2, which conflicts with a present shared lock 306a that has already been granted to another entity P1.

Configuration 404 shows an identification of the lock request(s) to be requeued in this arrangement. It has been identified that both lock requests 308b and 308c blocked behind lock request 308a in the lock request queue 308 are otherwise grantable. These lock requests are grantable because they request shared locks, which can be concurrently granted with the shared lock 306a that has already been granted. Therefore, these lock requests 308b and 308c can be requeued relative to lock request 308a. Any requeueing procedure may be used to logically requeue the lock requests in the lock request queue. One approach to lock requeueing is to move the blocking lock request(s) behind the grantable lock requests. Another approach is to move the grantable lock requests in front of the blocking lock request (s). Yet another approach is to move the timed-out request to the end of the queue. If multiple lock requests are to be requeued, the lock requests can be moved either as a group or individually. In the example of configuration 404, the blocking lock request 308a has been moved behind the grantable lock requests to the end of lock queue 308.

As shown in configuration 406, after lock requeueing has occurred, lock requests 308b and 308c are now ahead of lock request 308a in the lock request queue 308. Since lock requests 308b and 308c are seeking locks that are compatible with existing lock 306a, they can be immediately granted. Configuration 408 now shows the lock grant queue 306, which includes shared locks granted to entities P1, P3, and P4. The only remaining lock request in lock request queue 308 is lock request 308a.

In one embodiment, the blocking lock request should not be moved behind any other lock requests that cannot be immediately granted, such as another blocking lock request. For example, assume that there is lock request for an exclusive lock behind lock request 308a in the lock request queue 308. In this approach, the lock request 308a for an exclusive lock should not be re-ordered to be behind the additional request for an exclusive lock. The rationale for this policy is that this type of requeueing would not provide any benefit since the additional lock request would not be granted anyway.

Figure 5:
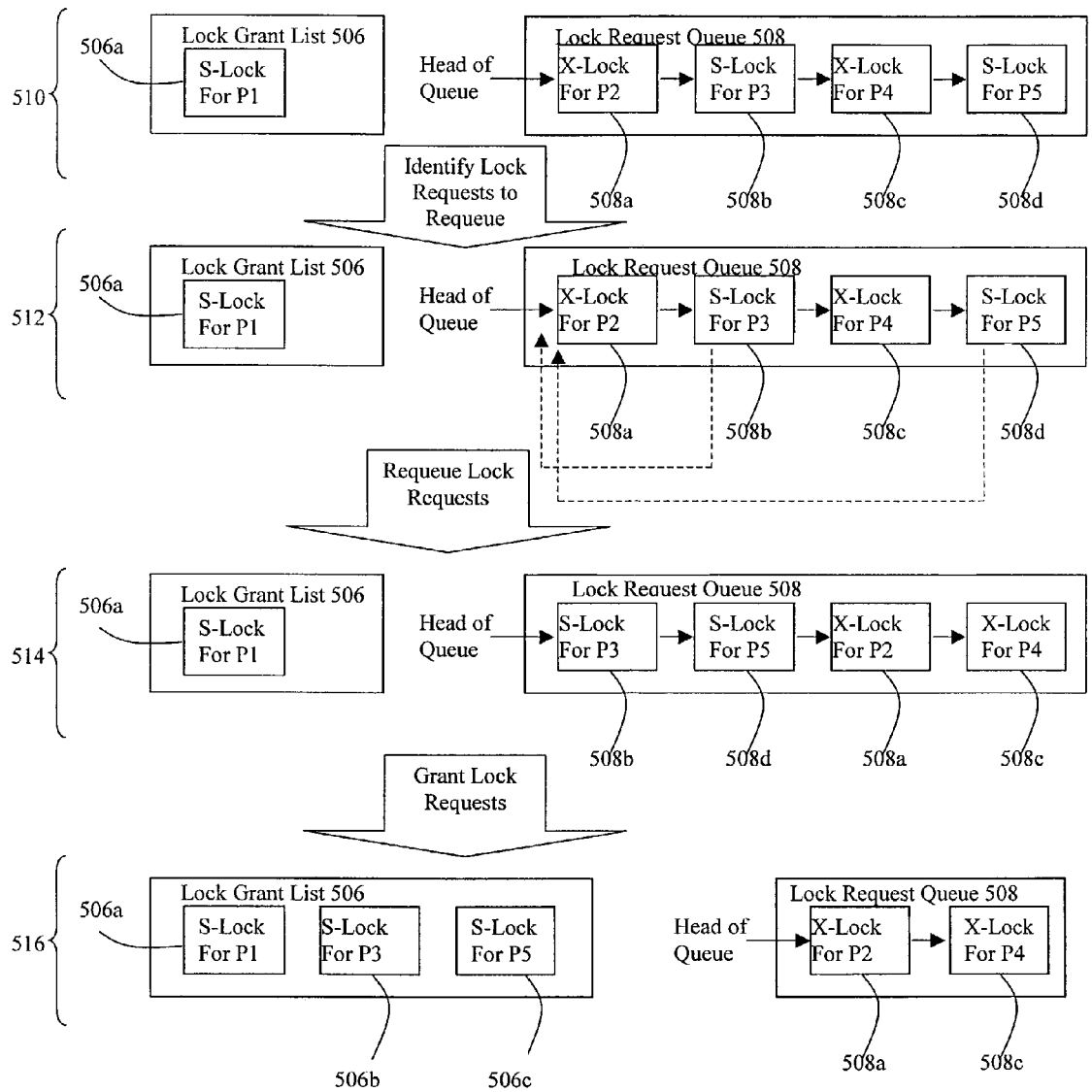

In one embodiment, grantable lock requests are permitted to be requeued ahead of multiple blocking lock requests. Consider the locking configuration 510 shown in FIG. 5. A pending shared lock 506a has already been granted to an entity P1. A lock request queue 508 exists that includes the following lock requests: a first lock request 508a for an exclusive lock for entity P2, a second lock request 508b for a shared lock for entity P3, a third lock request 508c for an exclusive lock for entity P4, and a fourth lock request 508d for a shared lock to entity P5. In this situation, lock request 508a at the head of the queue 508 cannot be granted since it seeks an exclusive lock that conflicts with the shared lock 506a already granted to P1.

Assume that an appropriate period of time has been given to allow lock request 508a to be granted but due to any number of reasons, e.g., deadlocks, lock request 508a cannot yet be satisfied. At this point, an identification is made of grantable lock requests that are queued behind lock request 508a in lock request queue 508. Here, it can be seen that lock requests 508b and 508d behind lock request 508a in the lock request queue 508 are otherwise grantable since they seek locks that are compatible with granted lock 506a. These lock requests are grantable because they request shared locks, which can be concurrently granted with the shared lock 506a.

However, it is noted that grantable lock request 508d is actually behind another blocking lock request 508c in lock request queue 508. Similar to lock request 508a, lock request 508c is also blocked because it seeks an exclusive lock for entity P4, which cannot be presently granted since it conflicts with the pending shared lock 506a already granted to entity P1.

In this approach to lock requeueing, the grantable lock requests are moved to the front of the queue before the blocking lock requests, even if one or more of the grantable lock requests must jump over multiple blocking lock requests. The grantable lock requests can be moved individually or as a group. As shown in configuration 512 for this example, lock requests 508b and 508d are identified to be requeued to the front of the lock request queue 508. Configuration 514 shows the results of the requeueing procedure, in which lock requests 508b and 508d have been moved ahead of blocking lock requests 508a and 508c in the lock request queue 508.

Since lock requests 508b and 508c are grantable and are at the head of the lock request queue 508, they can be immediately granted. Configuration 516 shows the revised lock grant list 506, which now includes additional shared locks 506b and 506c granted to entities P3 and P5. The only remaining lock requests in lock request queue 508 are blocked lock requests 508a and 508c.

Figure 6A:
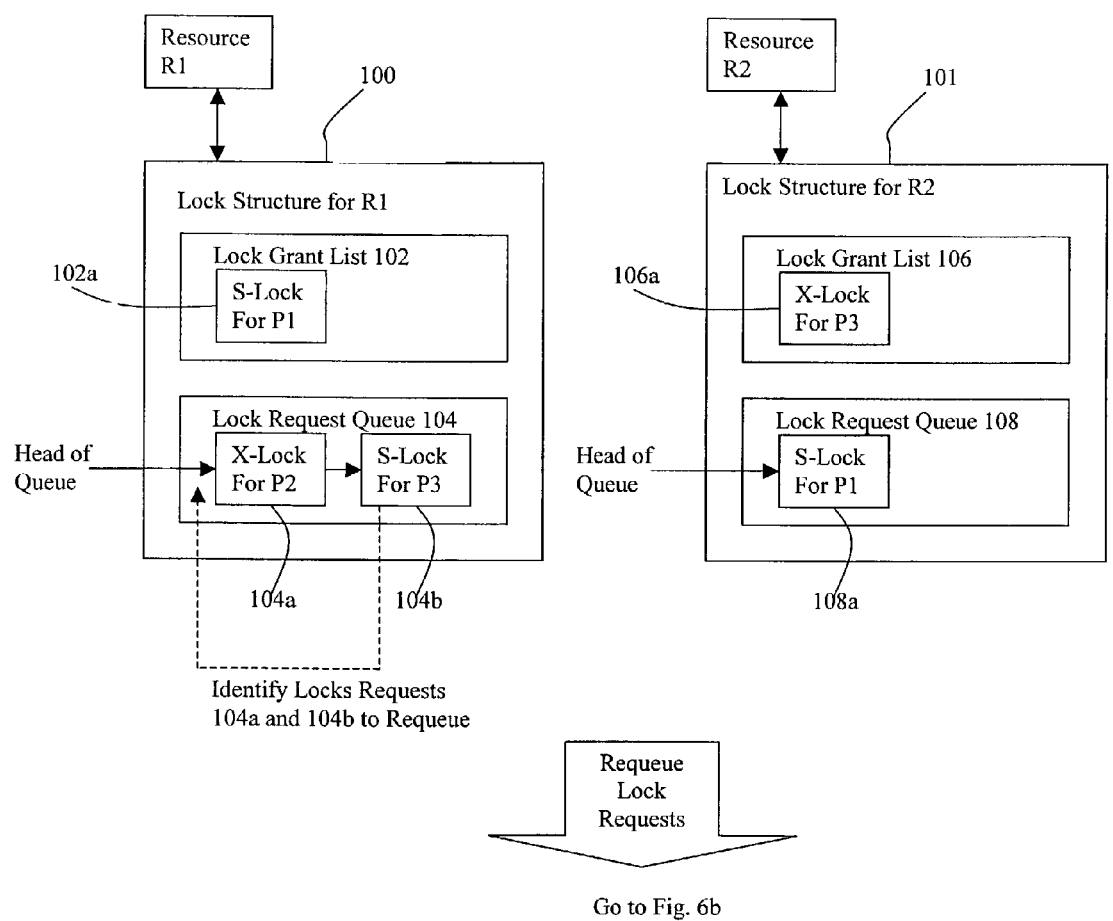
FIGS. 6a-g show lock requeueing applied to resolve the deadlock scenario of FIGS. 1a-b.

It can now be seen how lock requeueing will resolve the example deadlock situation shown in FIG. 1a. The lock arrangement of FIG. 1a has been reproduced in FIG. 6a. Recall that a deadlock situation exists since lock request 108a cannot be granted until P3 releases its exclusive lock 106a to R2. However, P3 will not release its exclusive lock 106a until it completes its work, which requires lock request 104b to be granted. Lock request 104b cannot be granted since it is blocked behind lock request 104a in lock request queue 104, and lock request 104a cannot be granted until P1 releases its lock 102a to R1. P1 cannot release its lock 102a to R1 until lock request 108a has been granted. Because P1, P2, and P3 are waiting for locks to be released before completing their work, but the locks cannot be granted to each other and the entities cannot proceed with work unless the others release one or more resource(s), they are deadlocked.

After an appropriate period of wait time, an identification is made of any presently non-grantable or exclusive lock requests that may be blocking grantable or shared lock requests. Here, lock request queue 104 includes an exclusive lock request 104a that is blocking shared lock request 104b. Lock request 104a is a blocking lock request since it is a request for an exclusive lock that cannot be granted while shared lock 102a is still pending. Lock request 104b is grantable since it seeks a shared lock which can concurrently exist with shared lock 102a. Therefore, lock requeueing can be performed to reorder lock request 104b ahead of lock request 104a in lock request queue 104.

Figure 6B:
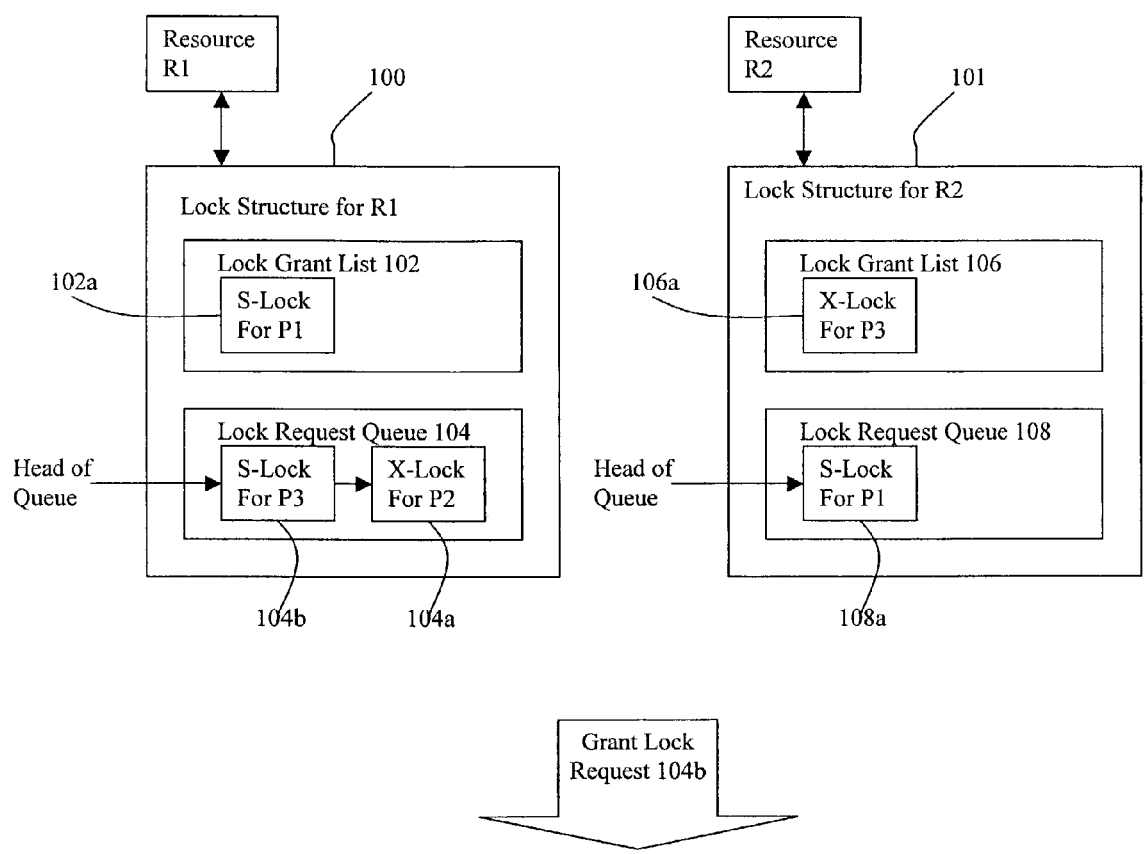

FIG. 6b shows the results of performing this type of lock requeueing. Referring to the lock request queue 104, it can now be seen that lock request 104b now appears ahead of lock request 104a in the queue. Since the shared lock sought by lock request 104b is compatible with shared lock 102a, it can be immediately granted to allow entity P3 to acquire a shared lock to resource R1.

Figure 6C:
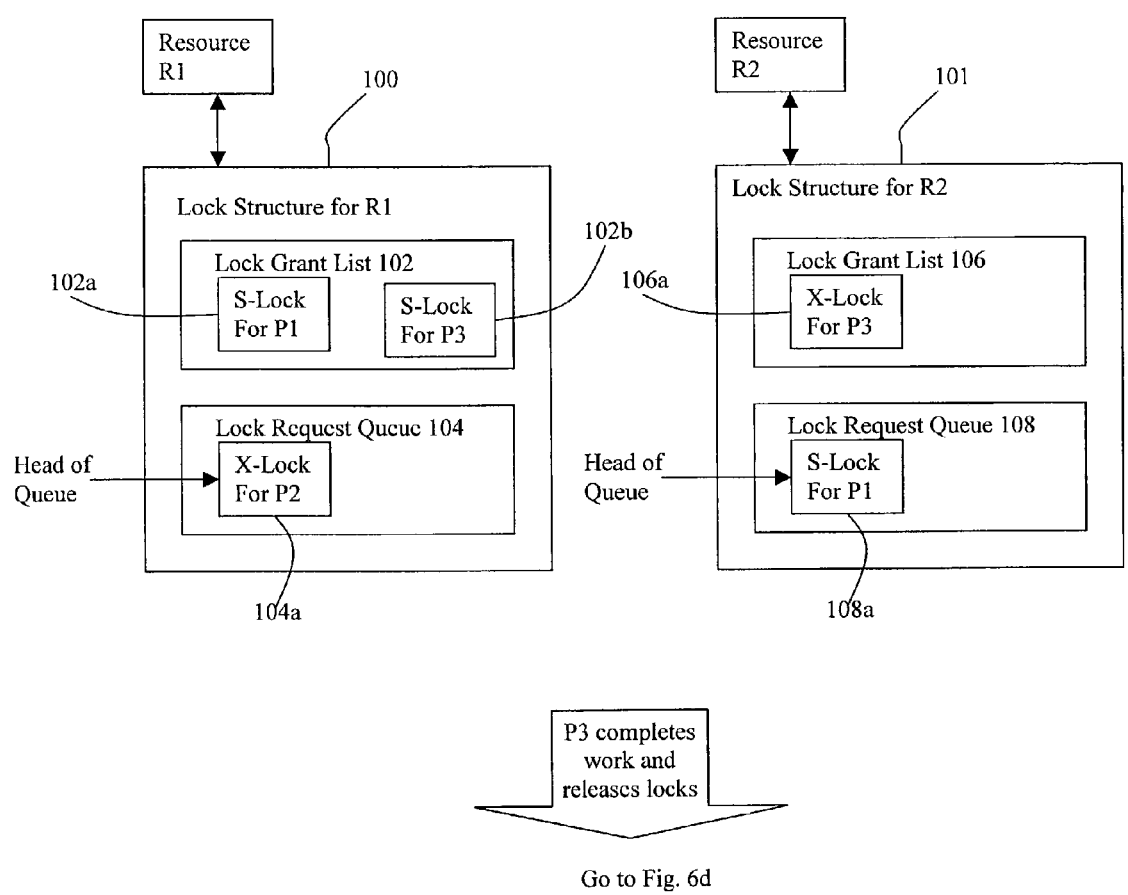

FIG. 6c shows the lock configuration once the shared lock 102b is granted to entity P3. Now that entity P3 has acquired the access it needs to resource R1, it can complete its work. Once entity P3 completes its work, all locks held by P3 can be released. These locks include lock 106a to resource R2 and lock 102b to resource R1. Note that lock 106a on resource R2 is presently blocking lock request 108a.

Figure 6D:
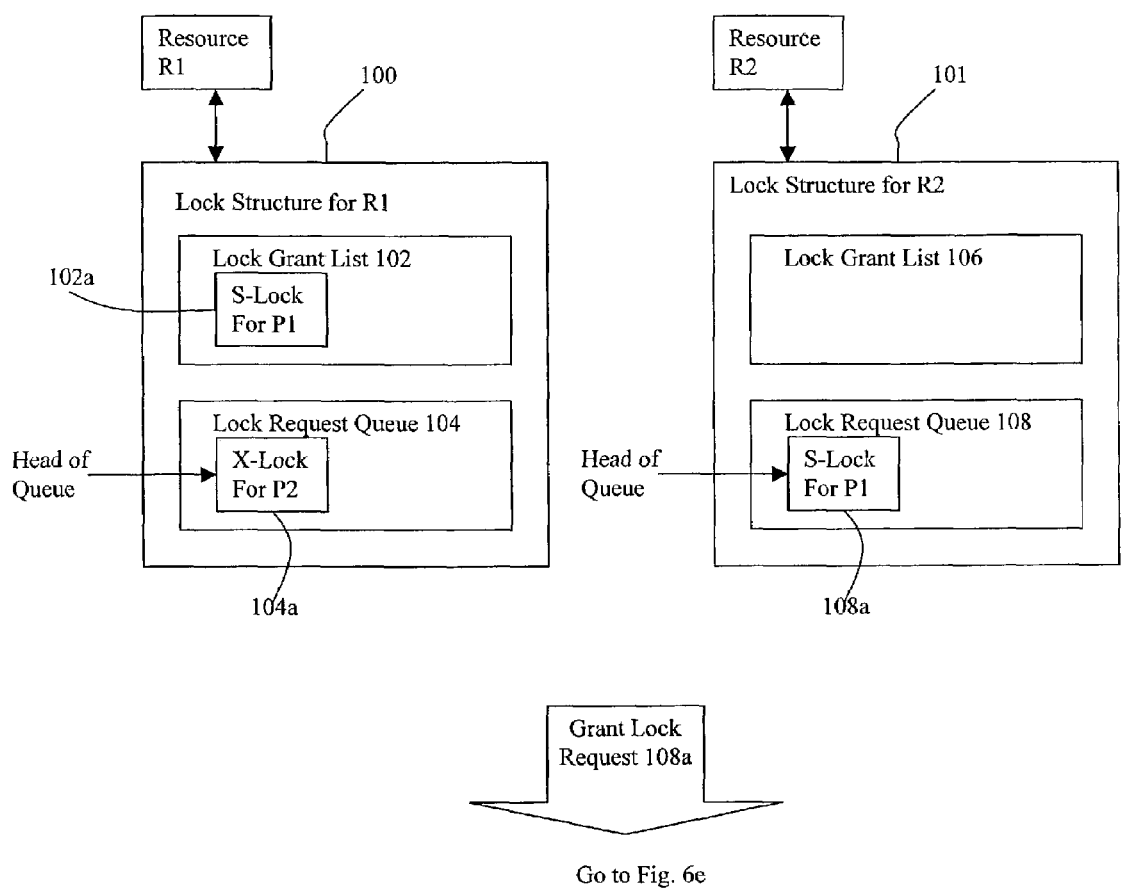

FIG. 6d shows the lock configuration after P3 completes its work and has released its locks. Since P3 has released its exclusive lock 106a to resource R2, other lock requests can now be granted for this resource. Therefore, lock request 108a can be granted for a shared lock to be held by entity P1 for resource R2.

Figure 6E:
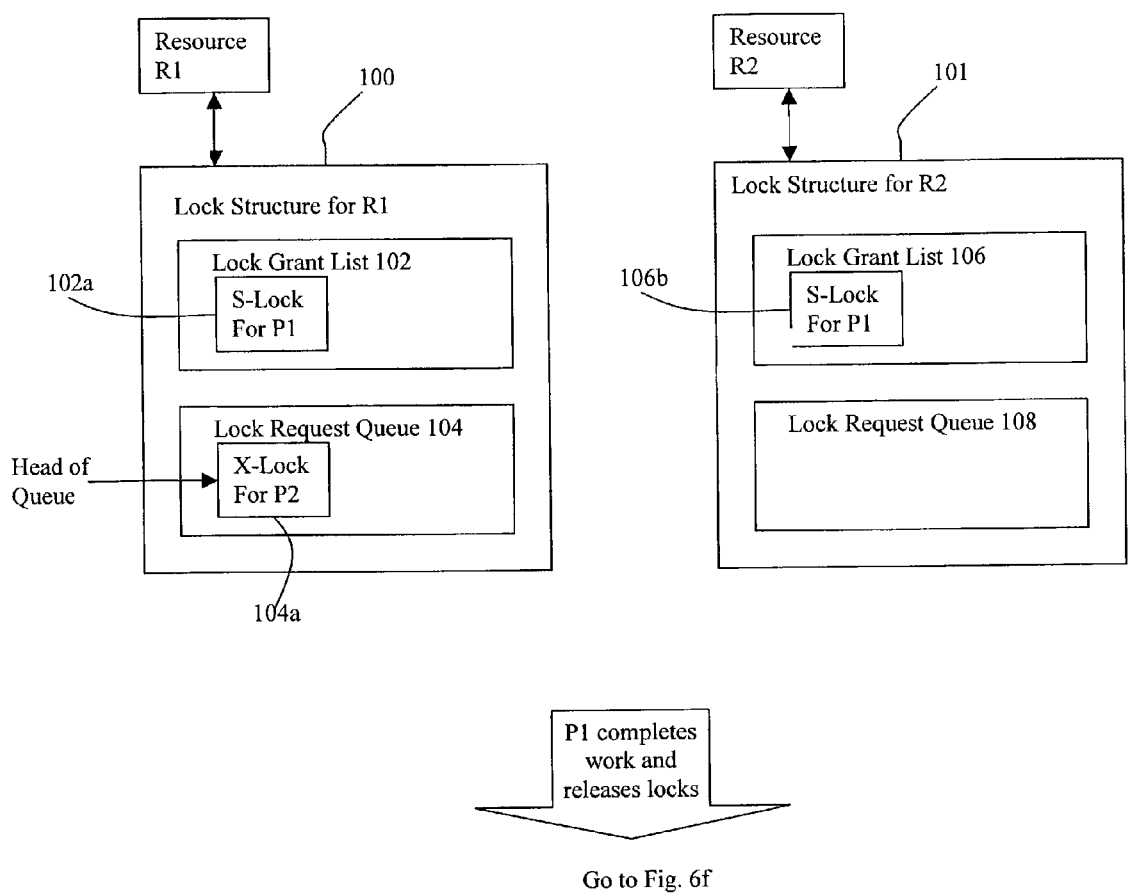

FIG. 6e shows the lock configuration after a lock 106b has been granted to entity P1 for resource R2. Since entity P1 now possesses the access to resource R2 it needs to complete its work, P1 can finish its work and release any locks it now holds. Therefore, once entity P1 completes its work, all locks held by P1 are released, including locks 102a and 106b. Note that lock 102a to resource R1 is presently blocking lock request 104a.

Figure 6F:
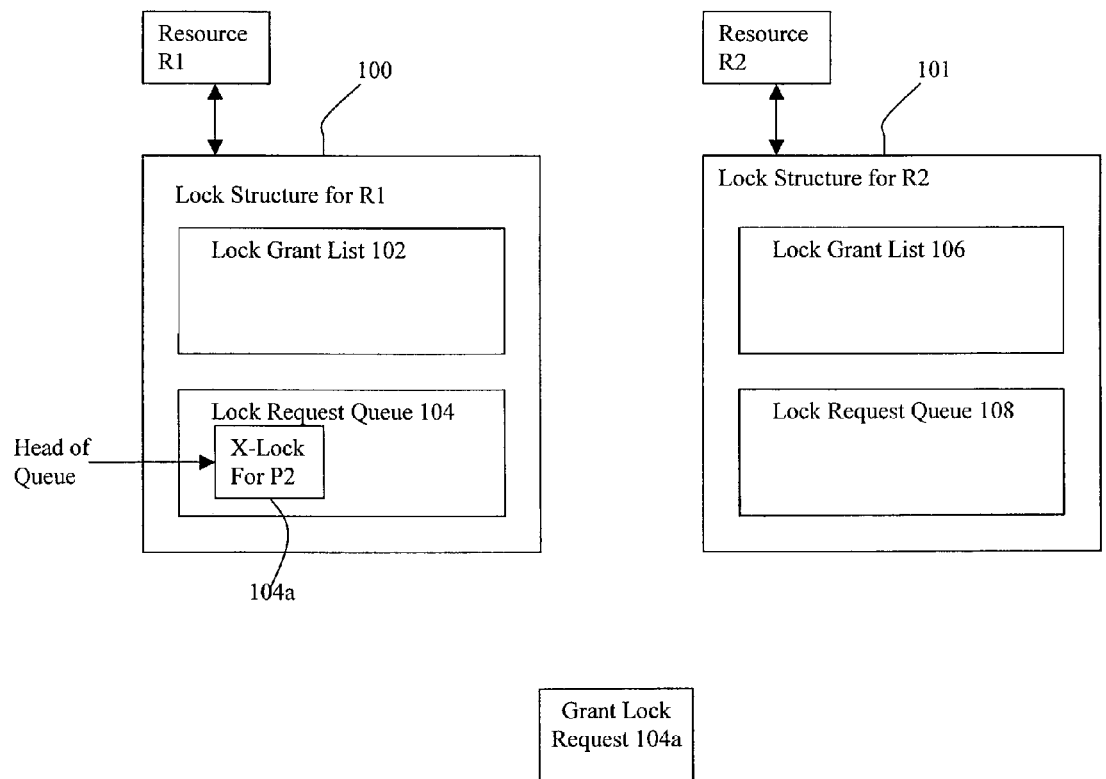

FIG. 6f shows the lock configuration after P1 completes its work and has released its locks. Since P1 has released its shared lock 102a to resource R1, other lock requests can now be granted for this resource. Therefore, lock request 104a can be granted for an exclusive lock to be held by entity P2 for resource R2.

Figure 6G:
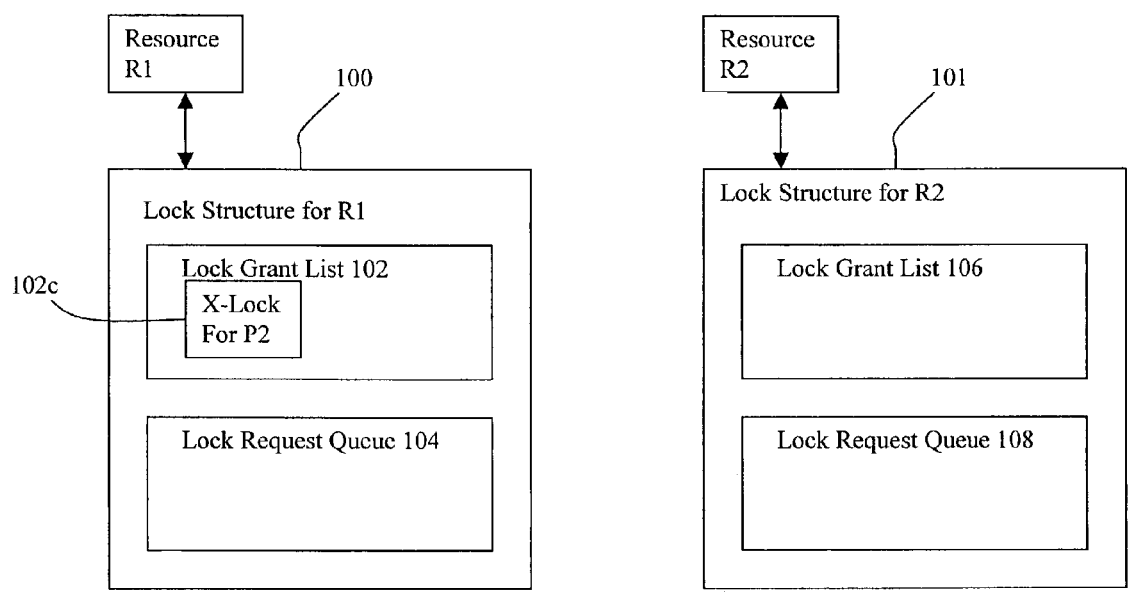

FIG. 6g shows the lock configuration after lock 102c has been granted to entity P2 for a shared lock to resource R1. As can be seen, the lock requeueing shown in FIGS. 6a-b has entirely resolved the original deadlock situation.

One advantage of this approach is that deadlock situations can be resolved even if the resource management situation involves locks for different classes of resources, locks or lock spaces in a computing or database system. This is because the lock requeueing process can be applied without any special knowledge of the type, importance, or specific interrelationships between different resources and locks in the system. For example, consider the example deadlock situation expressed in FIGS. 1a and 6a. Resources R1 and R2 could be from entirely different classes of systems resources, e.g., R1 could be metadata from a database row cache and R2 could be data from a buffer cache. As described above, the deadlock was resolved by reordering the lock requests for a subset of the identified resources involved in the deadlock, regardless the interrelationships between the various classes of resources and lockspaces that might have been involved in the deadlock. Of course, the present reordering process can be applied to resolve similar deadlocks even within the same class of resources or lockspaces.

Figure 7:
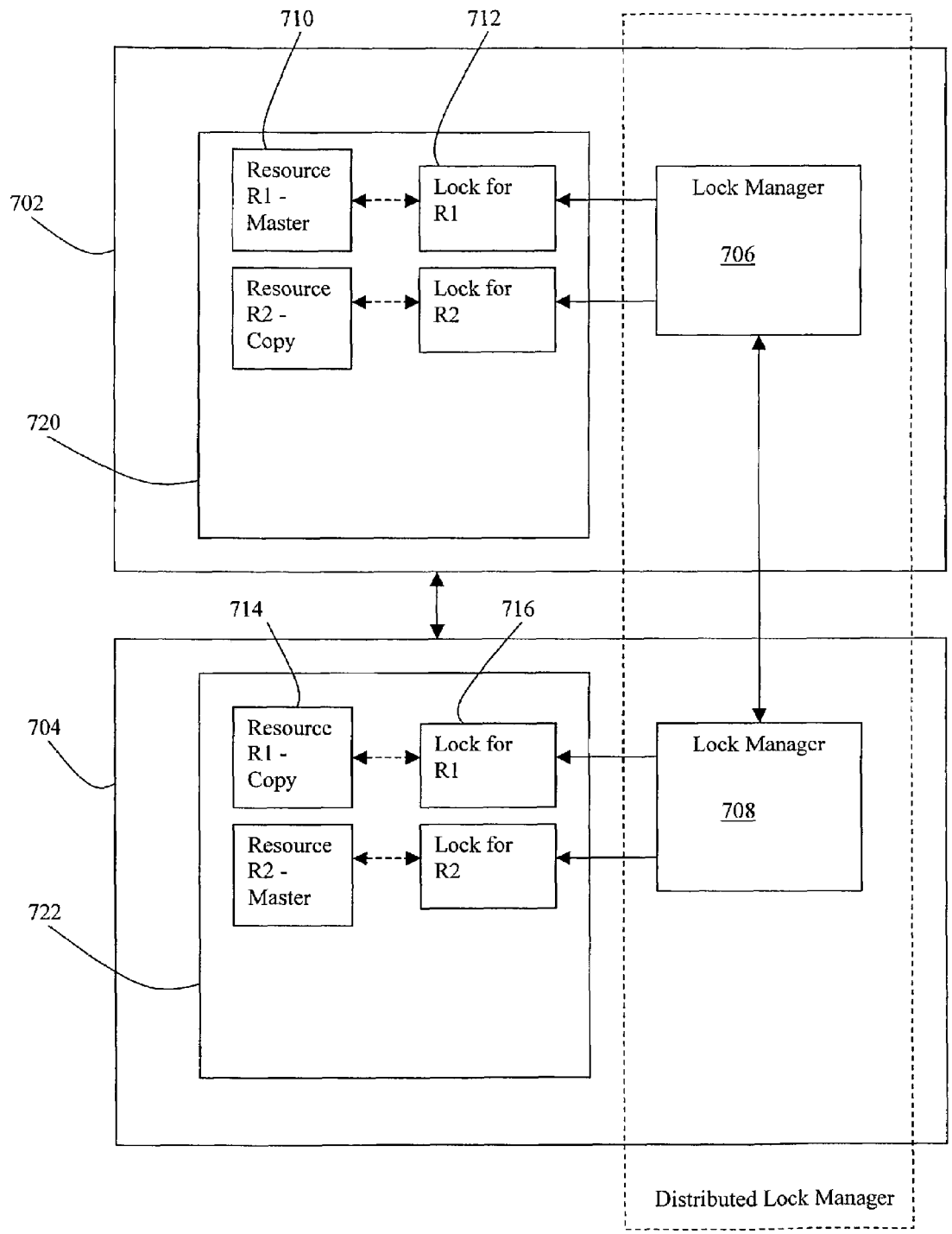
FIG. 7 shows an example distributed lock manager.

The present embodiment of a lock requeueing process can be applied to resolve deadlocks in a multi-node database cluster configuration, e.g., in which a single database may be spread across multiple networked nodes. For example, one approach for managing access to distributed resources is to use a Distributed Lock Manager (DLM). The DLM provides a distributed resource object architecture to spread lock management processing for any given resource among multiple nodes in the distributed system. FIG. 7 shows the architecture of an example DLM. In this example approach, each node 702 and 704 in the cluster contains a local lock manager 706, 708 that interfaces with local lock structures on its respective node. Each node may include a copy of a distributed resource that is accessed by that node. If the resource 710 was mastered at that node 702, then the local lock manager 706 will control the master 712 of the lock structure for that resource 710. The local lock manager for other nodes 704 that access a copy 714 of that resource will control a copy/slave 716 of the lock structure for that resource. The various distributed local lock managers 706, 708 interface and communicate among themselves to synchronize access to the resource and to coordinate the contents of the distributed lock request queues for the resources. The collection of local lock managers for the distributed nodes in the cluster comprises the DLM. The DLM may maintain its own list of owners and waiter for resources in the distributed system. When an exclusive lock request is made that cannot be immediately granted, a blocked asynchronous trap (BAST) message is sent to other instances. A special flag is set in the resource of the object for which an attempt is being made to lock, to indicate that it is desired to release the instance lock on the resource. Examples of DLM implementations are described in U.S. Pat. Nos. 6,272,491 and 6,405,274, which are hereby incorporated by reference in their entirety.

Distributed architectures such as the described DLM and clustered architectures present additional problems and complexities when attempting to resolve deadlock situations. If the resource is restricted to a single node, then that node merely needs to walk an "owner's list" to identify the entities that hold a resource in a deadlock situation—which allows identification of a deadlock and a path to deadlock resolution. However, in a clustered environment, multiple distributed caches 720, 722 may be used to store data and lock information on entirely different nodes within the distributed network. The exact same data item may be "virtually" accessible and stored among the different database instances in the system.

Since the resource may exist and be accessed on multiple instances in a distributed environment, this type of deadlock resolution is more problematic, since it may be difficult to even identify which of the other entities on the other nodes presently owns access rights to the resource in a way that conflicts with ownership at the present node. This is particularly a problem if the deadlock is caused by an interrelated chain of lock ownerships by multiple entities across the multiple, distributed nodes, and the deadlock resolution technique requires identification of these conflicting ownerships involved in the deadlock. Moreover, conventional DLMs only manage locks for a dedicated lockspace—entirely different DLMs are used to manage other lockspaces. Therefore, the required coordination may not be possible to resolve deadlocks across multiple instances for multiple lockspaces.

Figure 8:
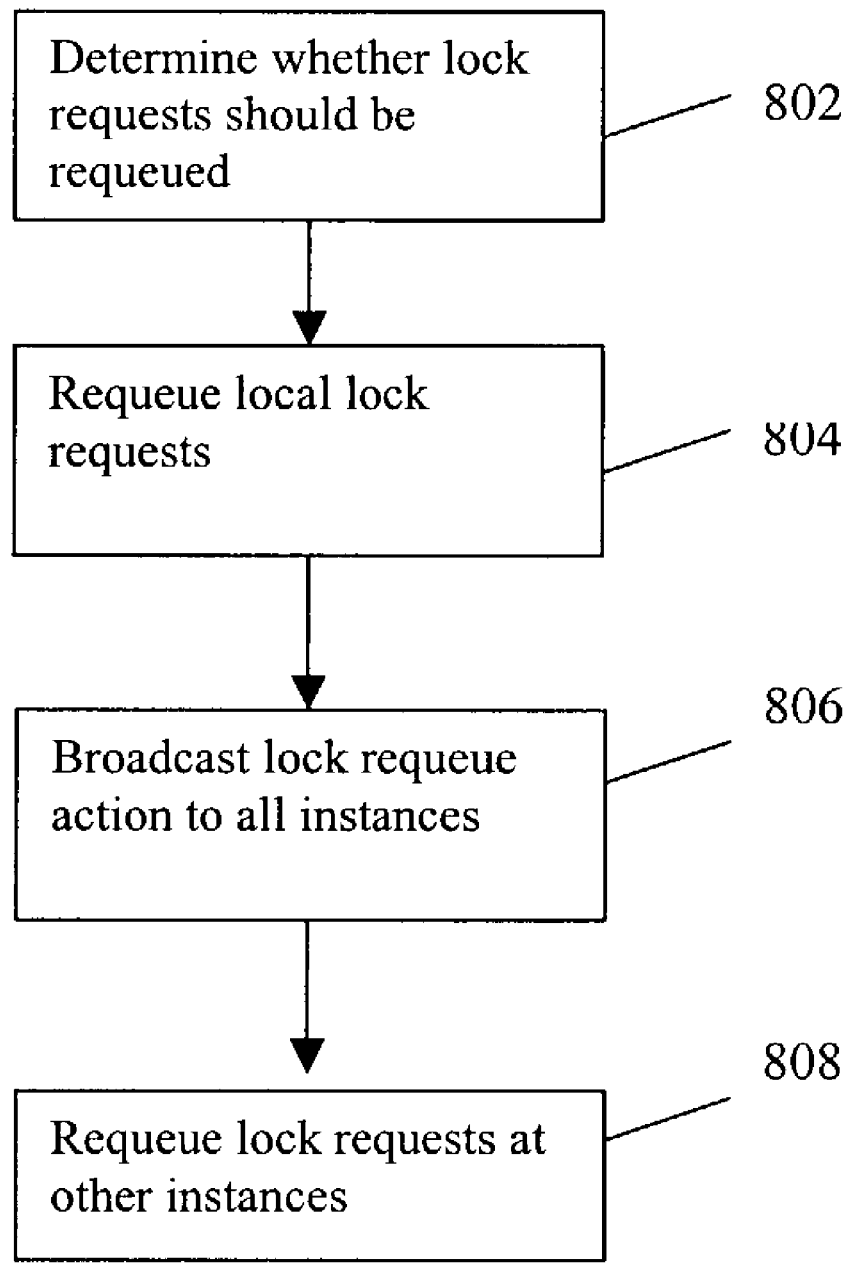
FIG. 8 shows a process for performing lock requeueing in a distributed environment according to an embodiment of the invention.

The present lock requeueing process can be applied to resolve deadlocks in a distributed cluster environment. FIG. 8 shows an embodiment of a process for lock requeueing in a distributed environment. At 202, a determination is made whether lock requests should be requeued. This determination is made, for example, using the approach described with respect to FIG. 2. For example, an appropriate wait period is established for any given lock request. If the period that the lock request exceeds the designated wait period or number of wait cycles, then an identification is made of whether lock requeueing is appropriate. One circumstance in which lock requeueing is appropriate is if the lock request is blocking other lock request(s) that are otherwise grantable or if the blocking lock request is for an exclusive lock and the following lock requests are for shared locks. If so, then the local lock request is requeued (804).

At this point, a message is broadcast to the network to allow other instances to perform their own lock requeue for their local lock structures (806). In one approach, a cross-instance call is performed to inform all other nodes (or only other interested nodes) that a requeue has occurred for a particular resource. The cross-instance call allows the specific action to be invoked across other instances. In the present embodiment, the instance that initially performs the requeue is also the instance that performs the broadcast. In one embodiment, the broadcast from the instance also goes to itself. In other configurations, the message is adapted to accomplish a similar result, e.g., in an architecture in which a centralized lock manager is employed, the process and message are sent to/from or handled by the centralized lock manager.

When the message is received at the distributed instances, the lock requests at the various instances are requeued pursuant to the broadcast message (808). In the present embodiment, the distributed instances will locate the resource that is being addressed for locking and verify that a release flag is set. The lock manager at the distributed instance thereafter accesses and loop through the lock request queue for the resource of interest, and performs a requeue to change any grantable lock requests from a "wait" status to allow immediate lock grants.

Figure 9:
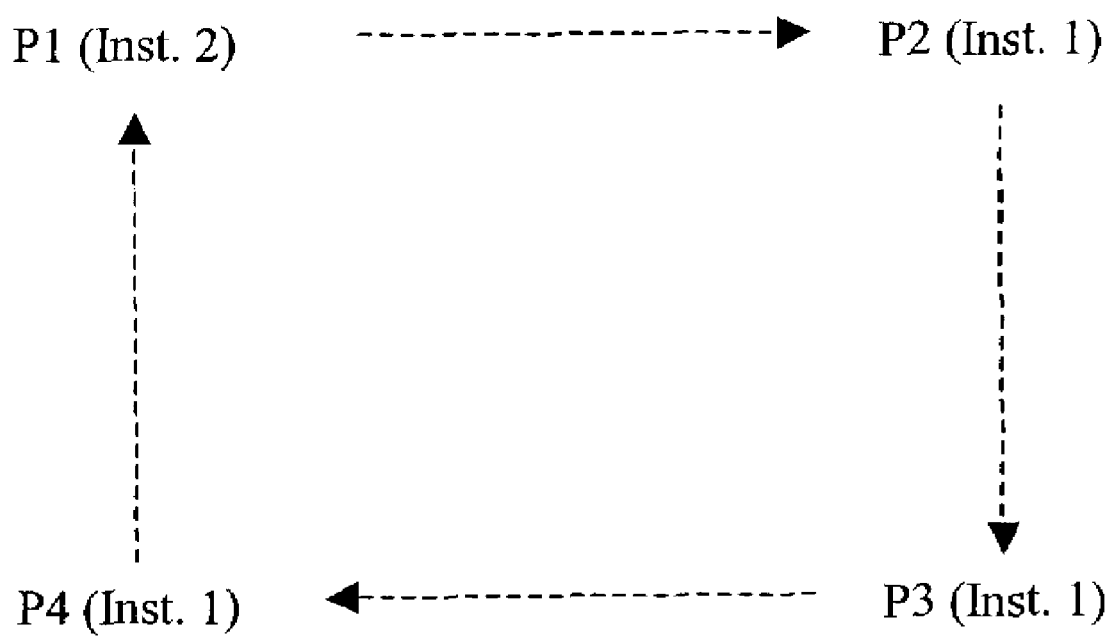
FIG. 9 shows another example deadlock scenario.

FIG. 9 shows an example deadlock scenario that may occur in a distributed, cluster environment across multiple lockspaces and across different levels of locks. As before, the symbol "Pa—>Pb" means that process Pa is blocked by process Pb.

In FIG. 9, process P1 on instance 2 has acquired a shared row cache lock and is waiting to upgrade a buffer cache lock on block B1 to exclusive mode. Process P1's request to acquire an exclusive lock is being blocked by process P2 on instance 1.

Process P2 owns a buffer cache lock on block B1 and is waiting for a buffer cache lock on block B2.

A recursive session on Process P3 owns block B2. The recursive session is waiting for a row cache shared lock on a logging resource (e.g., an "undo" record that is used in a database to roll back a change for either recovery or to provide an earlier version of the database).

However, there is a request for an exclusive lock for this same logging resource already ahead of it in the request queue by Process P4. Process P4, in turn, is being blocked by the shared row cache lock to the logging resource held by Process P1. This creates a deadlock situation.

Lock requeueing can be used to resolve this deadlock scenario. Here, the request by Process P4 for an exclusive lock can be requeued relative to the request by the recursive session on Process P3 for the logging resource. Reversing the order of these two locks requests will allow the recursive session on Process P3 to immediately obtain the requested row cache shared lock on the logging resource, since this lock does not conflict with the shared row cache lock being held by process P1. A lock requeue message is sent from instance 1 to other instances, including instance 2 to facilitate the lock requeue process. Once the lock requeue has occurred, Process P3 is permitted to acquire its desired lock to the logging resource.

Process P3 can therefore complete its work and release any held locks, including its lock to block B2. This allows process P2 acquire a buffer cache lock to block B2. Process P2 can now complete its work and release any held locks, including its lock on block B1. This allows process P1 to acquire an exclusive lock to block B1. Process P1 can now complete its work and release any held locks, including its lock to the logging resource. At this point, Process P4 is permitted to obtain its desired lock to the resource. As can be seen, the original deadlock has been fully resolved.

An embodiment of the invention is directed to making the lock requeueing process recoverable. If lock requests have been requeued at one instance but the process dies before posting or messaging to other instances, then a clean-up and/or monitoring process can be employed to determine whether the cross-instance call has been complete. This can be accomplished, for example, by setting a flag if a successful cross-instance message has been sent to other instances after a requeue. At a later point in time, the monitoring process will check whether the flag has been set to indicate that the message has been successfully sent. If not, then the system will retry the cross-instance message to make sure that other instances are aware that a requeue has occurred.

SYSTEM ARCHITECTURE OVERVIEW

Figure 10:
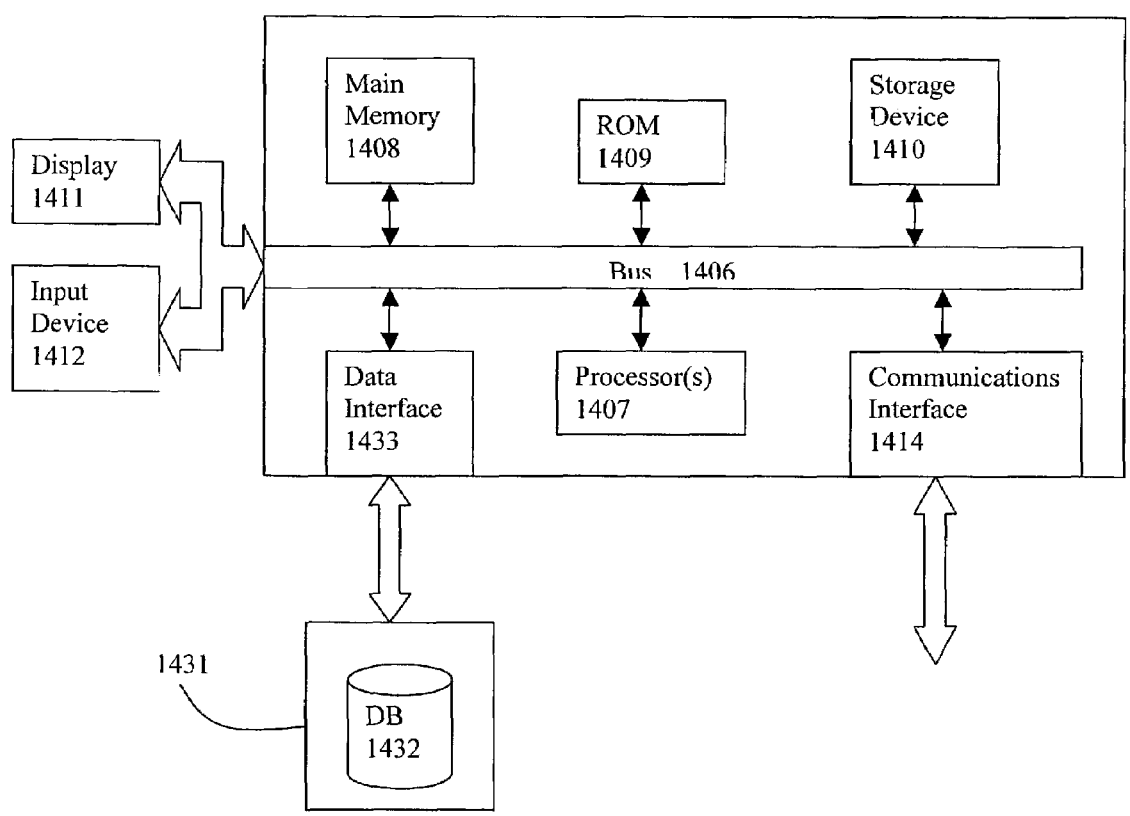
FIG. 10 is a diagram of a computer system with which the present invention can be implemented.

The execution of the sequences of instructions required to practice the invention may be performed in embodiments of the invention by a computer system 1400 as shown in FIG. 10. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

The block diagram of the functional components of a computer system 1400 according to an embodiment of the invention will now be described. As used herein, the term computer system 1400 is broadly used to describe any computing device that can store and independently run one or more programs. Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method for resolving a deadlock in a computing system, the computing system having a multi-node database cluster configuration in which a plurality of instances of a resource and an associated lock request queue are respectively distributed within a plurality of database nodes, the system also having a distributed lock manager comprising a collection of local lock managers, each node having a local lock manager, the method comprising:
   identifying a first request for an exclusive lock that is associated with the resource, the first request forming part of a deadlock in which the deadlock cannot be resolved unless the first request is granted;
   allowing a period of time for the first request to be granted;
   identifying a second request for a shared lock that exists behind the first request; and
   reordering a plurality of lock request queue instances to place the second request ahead of the first request in the respective lock request queue instance, the plurality of lock request queue instances comprises a lock request queue instance associated with a first database node and lock request queue instances associated with other database nodes, wherein the present configuration of locks allows the second request to be granted, and a granting of the second request initiates a chain of resource accesses that resolves the deadlock and allows the first request to be granted, in which the act of reordering comprises
   reordering the lock request queue instance associated with the first database node,
   broadcasting a message from a first local lock manager of the first database node to other local lock managers of the distributed lock manager of the other database nodes to inform the other database nodes that the lock request queue instance associated with the first database node has been reordered, and
   reordering the lock request queue instances at the other database nodes in response to the message sent by the first local lock manager.

2. The method of claim 1 in which the period of time comprises a number of wait cycles.

3. The method of claim 1 in which the deadlock involves multiple classes of resource and lock spaces.

4. The method of claim 3 in which the multiple classes of resources comprises a first class of resources directed to metadata and a second class of resources directed to data.

5. The method of claim 1 in which the first request identification and second request identification steps are performed at the first database node.

6. The method of claim 1 further comprising determining whether a failure has occurred during the reordering step.

7. The method of claim 6 in which a flag is set when the message has been successfully sent, wherein the flag is checked to determine whether a failure has occurred.

8. The method of claim 6 in which the message is resent if the failure has been identified.

9. The method of claim 1 in which the first request is placed at the end of each of the lock request queue instances.

10. The method of claim 1 in which the first request is not queued behind any other requests for an exclusive lock.

11. The method of claim 1 in which multiple lock requests are queued ahead of the first request.

12. A method for resolving a deadlock in a computing system, the computing system having a multi-node database cluster configuration in which a plurality of instances of a resource and an associated lock request queue are respectively distributed within a plurality of database nodes, the system also having a distributed lock manager comprising a collection of local lock managers, each node having a local lock manager, the method comprising:
 identifying a first request that is associated with the resource, the first request forming part of a deadlock;
 allowing a period of time for the first request to be granted;
 identifying a second request that exists behind the first request; and
 reordering a plurality of lock request queue instances to place the second request ahead of the first request in the respective lock request queue instance, the plurality of lock request queue instances comprises a lock request queue instance associated with a first database node and lock request queue instances associated with other database nodes, wherein the reordering action allows the second request to be granted ahead of the first request, and a granting of the second request initiates a chain of resource accesses that resolves the deadlock and allows the first request to be granted, in which the act of reordering comprises
  reordering the lock request queue instance associated with the first database node,
  broadcasting a message from a first local lock manager of the first database node to other local lock managers of the distributed lock manager of the other database nodes to inform the other database nodes that the lock request queue instance associated with the first database node has been reordered, and
  reordering the lock request queue instances at the other database nodes in response to the message sent by the first local lock manager.

13. The method of claim 12 in which the period of time comprises a number of wait cycles.

14. The method of claim 12 in which the deadlock involves multiple classes of resource and lock spaces.

15. The method of claim 14 in which the multiple classes of resources comprises a first class of resources directed to metadata and a second class of resources directed to data.

16. The method of claim 12 in which the first request identification and second request identification steps are performed at the first database node.

17. The method of claim 12 further comprising determining whether a failure has occurred during the reordering step.

18. The method of claim 17 in which a flag is set when the message has been successfully sent, wherein the flag is checked to determine whether a failure has occurred.

19. The method of claim 17 in which the message is resent if the failure has been identified.

20. The method of claim 12 in which the first request is placed at the end of each of the lock request queue instances.

21. The method of claim 12 in which multiple lock requests are queued ahead of the first request.

22. The method of claim 12 in which a determination is made whether the second request is otherwise grantable if queued ahead of the first request.

23. The method of claim 22 in which multiple grantable requests are queued ahead of the first request.

24. A computer program product comprising a non-volatile medium or a volatile medium having executable code to execute a process for resolving a deadlock in a computing system, the computing system having a multi-node database cluster configuration in which a plurality of instances of a resource and an associated lock request queue are respectively distributed within a plurality of database nodes, the system also having a distributed lock manager comprising a collection of local lock managers, each node having a local lock manager, the process comprising the steps of:
 identifying a first request that is associated with the resource, the first request forming part of a deadlock;
 allowing a period of time for the first request to be granted;
 identifying a second request that exists behind the first request in a lock request queue instance located at a database node;
 reordering the lock request queue instance to place the second request ahead of the first request in the lock request queue instance, wherein the reordering action allows the second request to be granted ahead of the first request, and a granting of the second request initiates a chain of resource accesses that resolves the deadlock and allows the first request to be granted, in which the act of reordering comprises
 reordering the lock request queue instance associated with a first database node, and
 broadcasting a message from a first local lock manager of the first database node to other local lock managers of the distributed lock manager of the other database nodes to inform the other database nodes that the lock request queue instance associated with the first databases has been reordered; and
 reordering lock request queue instances at the other database nodes.

25. A system for resolving a deadlock in a computing system having a plurality of database nodes and a distributed lock manager, the distributed lock manager comprising a collection of local lock managers, each node comprising:
 an instance of a resource;
 an instance of a lock request queue; and
 a first local lock manager configured for
  identifying a first request that is associated with the resource, the first request forming part of a deadlock,
  allowing a period of time for the first request to be granted,
  identifying a second request that exists behind the first request in the lock request queue instance,
  reordering the lock request queue instance to place the second request ahead of the first request in the lock request queue instance, and
 broadcasting a message from the first local lock manager to other local lock manager to inform the other database nodes that the lock request queue instance has been reordered, so that other request queue instances can also be reordered.
 wherein the reordering action allows the second request to be granted ahead of the first request, and a granting of the second request initiates a chain of resource accesses that resolves the deadlock and allows the first request to be granted.

26. A computer program product comprising a non-volatile medium or a volatile medium having executable code to execute a process for resolving a deadlock in a computing system, the computing system having a multi-node database cluster configuration in which a plurality of instances of a resource and an associated lock request queue are respectively distributed within a plurality of database nodes, the system also having a distributed lock manager comprising a collection of local lock managers, each node having a local lock manager, the process comprising the steps of:

identifying a first request for an exclusive lock that is associated with the resource, the first request forming part of a deadlock;

allowing a period of time for the first request to be granted;

identifying a second request for a shared lock that exists behind the first request in a lock request queue instance;

reordering the lock request queue instance to place the second request ahead of the first request in the lock request queue instance, wherein the reordering action allows the second request to be granted ahead of the first request, and a granting of the second request initiates a chain of resource accesses that resolves the deadlock and allows the first request to be granted, in which the act of reordering comprises reordering the lock request queue instance associated with a first database node, and sending a message from a first local lock manager of the first database node to other local lock managers of the distributed lock manager of the other database nodes to inform the other database nodes that the lock request queue instance associated with the first database node has been reordered; and reordering lock request queue instances at the other database nodes.

27. A system for resolving a deadlock in a computing system having a plurality of database nodes and a distributed lock manager, the distributed lock manager comprising a collection of local lock managers, each node comprising:

an instance of a resource;

an instance of a lock request queue; and a first local lock manager configured for identifying a first request for an exclusive lock that is associated with a resource, the first request forming part of a deadlock, allowing a period of time for the first request to be granted, for identifying a second request for a shared lock that exists behind the first request in the lock request queue instance, reordering the lock request queue instance to place the second request ahead of the first request in the lock request queue instance, and broadcasting a message from the first local lock manager to other local lock managers of the distributed lock manager of the other nodes to inform the other database nodes that the lock request queue instance has been reordered, wherein the reordering action allows the second request to be granted ahead of the first request, and a granting of the second request initiates a chain of resource accesses that resolves the deadlock and allows the first request to be granted, and reorders lock request instances at the other database nodes in response to the message sent from the first local lock manager.

28. The method of claim 1 in which the period of time comprises a prescribed period.

29. The method of claim 12 in which the period of time comprises a prescribed period.

30. The computer program product of claim 24 in which the period of time comprises a prescribed period.

31. The computer program product of claim 24 in which the deadlock involves multiple classes of resource and lock spaces.

32. The system of claim 25 in which the period of time comprises a prescribed period.

33. The system of claim 25 in which the deadlock involves multiple classes of resource and lock spaces.

34. The computer program product of claim 26 in which the period of time comprises a prescribed period.

35. The computer program product of claim 26 in which the deadlock involves multiple classes of resource and lock spaces.

36. The system of claim 27 in which the period of time comprises a prescribed period.

37. The system of claim 27 in which the deadlock involves multiple classes of resource and lock spaces.

* * * * *

UNITED STATES PATENT AND TRADEMARK OFFICE
CERTIFICATE OF CORRECTION

| | |
|---|---|
| PATENT NO. | : 7,337,290 B2 |
| APPLICATION NO. | : 10/406880 |
| DATED | : February 26, 2008 |
| INVENTOR(S) | : Rajamani et al. |

It is certified that error appears in the above-identified patent and that said Letters Patent is hereby corrected as shown below:

On the Title page, in field 54, in column 1, under "Title", line 2, delete "REQUEING" and insert -- REQUEUING --, therefor.

In column 1, line 2, delete "REQUEING" and insert -- REQUEUING --, therefor.

In column 16, line 38–39, in claim 24, delete "databases" and insert -- database node --, therefor.

In column 16, line 62, in claim 25, delete "reordered." and insert -- reordered; --, therefor.

Signed and Sealed this

Third Day of November, 2009

David J. Kappos
*Director of the United States Patent and Trademark Office*